US011487853B2

(12) United States Patent
Wang et al.

(10) Patent No.: US 11,487,853 B2
(45) Date of Patent: Nov. 1, 2022

(54) CLUSTER-WISE LICENSE INFORMATION REPLICATION

(71) Applicant: VMware, Inc., Palo Alto, CA (US)

(72) Inventors: Junfeng Wang, Beijing (CN); Jin He, Beijing (CN); Qi Liu, Beijing (CN); Xiangjun Song, Beijing (CN); Yu Wang, Beijing (CN); Li He, Beijing (CN); Xiangdong Che, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 624 days.

(21) Appl. No.: 16/439,729

(22) Filed: Jun. 13, 2019

(65) Prior Publication Data
US 2020/0394282 A1 Dec. 17, 2020

(51) Int. Cl.
*G06F 21/10* (2013.01)
*G06K 7/14* (2006.01)

(52) U.S. Cl.
CPC .... *G06F 21/105* (2013.01); *G06F 2221/0773* (2013.01); *G06K 7/1417* (2013.01)

(58) Field of Classification Search
CPC ............ G06F 21/05; G06F 2221/0773; G06K 7/1417

USPC .......................................................... 726/26
See application file for complete search history.

(56) References Cited

U.S. PATENT DOCUMENTS

2012/0297487 A1* 11/2012 Xia .......................... G06F 21/10
726/26
2019/0005205 A1* 1/2019 Dargar .................. G06F 21/105

\* cited by examiner

*Primary Examiner* — Michael S McNally
(74) *Attorney, Agent, or Firm* — Su IP Consulting (57) ABSTRACT

System and methods for replicating and enforcing license information in a computer cluster are described. The method may include: receiving, by a core-node in the computer cluster, a plurality of peer-license-info from a plurality of peer-nodes selected from a plurality of cluster nodes. Each of the plurality of peer-license-info may include license-info collected by and associated with a corresponding one of the plurality of peer-nodes. The method may include generating, by the core-node, a first cluster-license-info based on the plurality of peer-license-info. The method may further include propagating, by the core-node, the first cluster-license-info to each of the plurality of peer-nodes. The first cluster-license-info is configured for detecting license violations among the plurality of cluster nodes.

14 Claims, 4 Drawing Sheets

CLUSTER-WISE LICENSE INFORMATION REPLICATION

BACKGROUND

In a clustered computing environment ("computer cluster"), validating and enforcing software licenses often requires storing and managing the license information of the cluster nodes in a centralized node. In an end-user's computer cluster site, a software vendor may need to verify whether there is any illegal or unauthorized usage of its software by communicating either with each cluster node, or by obtaining a copy of the license information from the centralized node. However, a provider of the end-user site may be uncomfortable to expose its critical IT properties including license information to the software vendor. Therefore, software vendors may have to dispatch field operators to the end-user site, and try to detect any license abuses while performing on-site supports. Still, in this centralized license information configuration, it is hard for the field operators to convince the end-user site to allow access to its centralized node.

In another conventional license management methodology, license management software (e.g., the RLM from reprise) may be used to manage license information for the computer cluster. This license management software may be composed of a specific license agent, license files and client library. However, all the software to be protected by the license agent must be linked with the client library. Further, during running time, the license agent must directly interact with the software to validate the license in-use. Thus, such a method may bring more complexity and costs to the management of any software. And it's tough for field operators to distinguish a valid license from an illegal one.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure is related to apparatus and methods to improve the efficiency of illegal license detection in mission critical and high value cluster software. Illegal use of software without proper licenses not only causes huge revenue losses for software vendors, but also hurts or even destroys software industry in the long run. For mission critical and high value software, on-site service requests through software vendors' own field operators may present a good chance to detect illegal software license abuse. However, license management component of the cluster software is usually deployed in a centralized license management node, and any access by external field operators is usually denied. In other situations, the license information may spread across multiple nodes in the computer cluster, making evaluating software license one node at a time tedious and near-impossible. Thus, many potential license abuse cases may never be detected if the service request is based on one valid license, while the other nodes do not have proper licenses.

The present disclosure relates to the replicating and enforcing of license information of mission critical and high value software across the whole computer cluster. In particular, the present disclosure uses a multicast-based cluster-wise license information transfer protocol to rapidly and robustly replicate license information to each cluster node in the computer cluster in a scalable way, and use encryption to protect the replicated license information from malicious attacks. In addition, a field operator may use a smartphone application to access any single node in the computer cluster, and quickly detect license abuse in the whole computer cluster.

Figure 1:
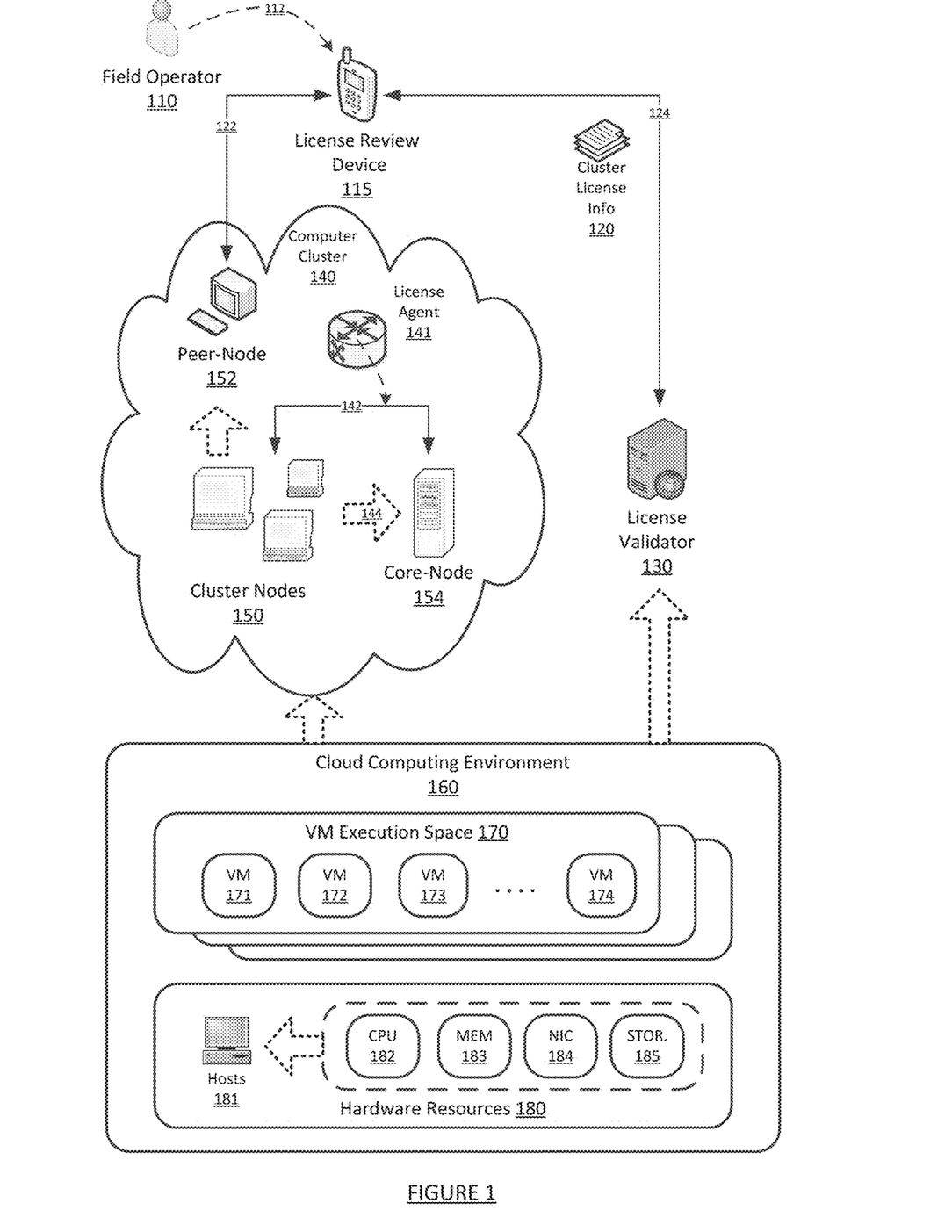
FIG. 1 illustrates a block diagram of a system configured to provide cluster-wise license information replication and validation, according to one or more embodiments of the present disclosure.

FIG. 1 illustrates a block diagram of a system configured to provide cluster-wise license information replication and validation, according to one or more embodiments of the present disclosure. In FIG. 1, the system may include a computer cluster 140 and a license validator 130. The computer cluster 140 and/or the license validator 130 may be implemented using one or more clouds based on a cloud computing environment 160. During operation, a set of license agents 141 may be configured to manage the various licenses in the computer cluster 140. And a field operator 110 may utilized a license review device 115 to retrieve and review the license information associated with the computer cluster 140.

In some embodiments, the computer cluster 140 may include a set of computer nodes 150 loosely or tightly connected via a cluster network. Each of the computer nodes 150 may be referred to as a "cluster node", "computer node", or "node." Further, each cluster node 150 may be a computing device or an electronic device capable of operating jointly or independently. For example, a cluster node 150 may be a personal computer, a server computer, a smartphone, a consumer device such as television, a vehicle control device installed on a car, or any other device that has computational and networking capabilities.

In some embodiments, the cluster nodes 150 in the computer cluster 140 may be integrated together so that they can be viewed as a single system from an external perspective. The cluster nodes 150 may be connected to one or more cluster networks, so that one cluster node 150 may be able to directly or indirectly communicate with any other cluster nodes 150 in the computer cluster 140. The cluster network may be implemented using one or more network communication protocols that allow network messages to be broadcasted, relayed, and otherwise delivered, and may be an Ethernet, Local Talk, Straight Bus, FDDI Ring, Token Ring, ATM, Star Network, or peer-to-peer network.

In some embodiments, the cluster node 150 may be installed with their respective instances of operating system and software, and may perform the same or different tasks according to cluster configurations. Multiple cluster nodes 150 may be deployed with redundancy, fault-tolerance, or failover capabilities, in order to improve performance and availability over that of a single computer. Thus, the computer cluster 140 may have a wide range of applicability and deployment, ranging from small business clusters with a handful of nodes to supercomputers within hundred-thousand of nodes.

In some embodiments, each of the cluster nodes 150 may be installed with certain software applications that are subject to various software licenses. A "license" may be a legal instrument governing the terms and conditions related to the use or distribution of a specific software or application. Types of license may include, without limitation, device-based, user-based, individual, group, periodical, subscription, and/or perpetual. For example, a "device-based license" may be associated with a specific device (or CPU), and may only allow this specific device to execute the software regardless of the number of users that can access the software through this specific device. A "user-based license" may be associated with a specific user, and may only allow the specific user to use the software regardless of from which devices the user may access the software. From a quantity perspective, an "individual license" may be used on one device or by a single user; a "group license" may allow a fixed number of concurrent devices or users to use the software at the same time; a "periodical license" may allow the usage of software within a specified time period; a "subscription license" may allow the usage of software within a renewable time period; and a "perpetual license" may allow the usage of software indefinitely. In some instance, a software license may be configured with multiple license types. For example, a software application may require a license that is user-based, group, and periodical.

In some embodiments, the computer cluster 140 may be configured with one or more multicast-based license agents 141 to manage the various types of licenses that are activated in the cluster nodes 150. Specifically, each of the cluster nodes 150 may be installed with a corresponding license agent 141, and these license agents 141 may communicate among themselves via the cluster network for the replicating and enforcing of software licenses in the computer cluster 140. In other words, each license agent 141 may monitor the status and usage of the software licenses in the specific cluster node 150 on which the license agent 141 is installed. The license agents 141 may generate license information from the cluster nodes 150, and may further propagate, aggregate, and synchronize the license information collected from these cluster nodes 150.

In some embodiments, the license agents 141 among the cluster nodes 150 may use a quorum-based election algorithm to dynamically elect (144) one of the cluster nodes 150 to act as a license-info aggregation and distribution center. The elected cluster node may be referred to as a core-node 154, which may be responsible for collecting and distribution cluster-wise license information among all the cluster nodes 150. The rest of the cluster nodes 140 that are not elected core-node 154 may be referred to as "cluster member nodes" or "peer-nodes" (e.g., peer-node 152). If the core-node 154 is no longer accessible due to hardware, software, or network failures, the license agents 141 among the peer-nodes may dynamically elect another one of the cluster nodes 150 to serve as the new core-node 154. In this case, all the other cluster nodes 150 that are not the core-node 154 may be deemed peer-nodes. When the original core-node is accessible again, it may detect a new core-node 154 in the computer cluster 140, and may adjust itself to be a peer-node. For convenience purposes, all license-related communications among the cluster nodes 150 may be assumed being performed by the corresponding license agents 141 installed on these cluster nodes 150.

In some embodiments, the cluster nodes 150 may utilize multicast communications 142 to broadcast and transmit license-related network messages. Specifically, the core-node 154 may broadcast a collection-request message to the peer-nodes. Upon receiving this collection-request message, each peer-node may continuously monitor and collect its own license information, and generate a license-info corresponding to the peer-node. Specifically, "license-info" may contain a license-configuration and a license-usage-data. The "license-configuration" may specify the types of licenses (e.g., user-based, group, etc.) as well as the status of the licenses (e.g., activated, expired, un-licensed, etc.). The "license-usage-data" may record the device information associated with the cluster node the software is installed on, as well as the number of users, the number of simultaneous users, the user IDs, and the access info (e.g., timestamp) associated with software usage. Thus, license-info from the peer-node 152 or the core-node 154 may be referred to as "peer-license-info".

In some embodiments, the peer-nodes may transmit the generated peer-license-info to the core-node 154, and the core-node 154 may aggregate and synchronize the multiple peer-license-info (including its own license-info) into a "cluster-license-info", which may contain the license-configurations and license-usage-data of all the cluster nodes 150. Afterward, the core-node 154 may distribute copies of the cluster-license-info to each of the peer-nodes. The above multicast communications 142 among the license agents 141 may be implemented using any communication protocols which can transmit/deliver a copy of network message from one cluster node to multiple cluster nodes, asynchronously or synchronously, over wired or wireless network.

In some embodiments, a field operator 110 may be a person who needs to access a particular peer-node 152 in the computer cluster 140 for a particular purpose (e.g., maintaining and servicing the hardware and software on this particular cluster node). The field operator 110 may also access any one of the cluster nodes 150 or the core-node 154. During inspection, the field operator 110 may utilize a license review device 115 to interact with the peer-node 152. The license review device 115 may be a portable device (e.g., laptop or smartphone) that can communicate with the peer-node 152 using wired or wireless network communications (e.g., WIFI, Bluetooth, mobile network communications). For example, the license review device 115 may be a smartphone equipped with at least one camera, and can connect to carrier wireless network. Further, the smartphone may be installed with a "smartphone application", or "app", to interact with the peer-node 152.

In some embodiments, the license review device 115 may retrieve from the peer-node 152 the cluster-license-info 120 stored therein, and transmit it to a license validator 130 for license authentication and validation. Specifically, the license validator 130 may be a remote server that can evaluate the cluster-license-info 120 to determine whether there are any license violations in any of the cluster nodes 150. License violations may include license-expiration violation, a license-abuse violation, or a no-license violation. License-expiration may refer to the expiration of any previous valid license; license-abuse indicates there might be hacked licenses or unauthorized or misused licenses. For example, having more concurrent users than the license allowed may be a form of license misuse. No-license means there is no valid license installed.

In some embodiments, the license validator 130 may generate a "license evaluation status", which may identify those cluster nodes 150 having license violations, and transmit this license evaluation status to the license review device 115. The field operator 110 may then take appropriate actions to enforce the licensing situations in the computer cluster 140. Further, the license validator 130 may generate a "revised cluster-license-info" based on the received cluster-license-info 120, and transmit the revised cluster-license-info to the license review device 115 for license enforcement. The revised cluster-license-info may contain a set of enforcement actions that can be invoked to enforce licenses in the computer cluster 140. For example, the revised cluster-license-info may contain enforcement actions to activate/deactivate certain licenses in some of the cluster nodes 150, and/or adjust the number and types of licenses for other cluster nodes 150 accordingly.

In some embodiments, the license review device 115 may transmit the revised cluster-license-info to the peer-node 152, which may in turn propagate this revised cluster-license-info to all the cluster nodes 150 using multicast communications 142. For each of the cluster nodes 150, its license agent 141 may process the revised cluster-license-info it received, and perform any enforcement actions that are applicable to the present cluster node. Thus, the license agents 141 may activate/deactivate or adjust the licenses to enforce license compliance in the computer cluster 140

Thus, by using a light-weight replication protocol and efficiently distributing cluster-wise license information to every cluster node 150, the above approach may enable field operator to efficiently validate and enforce software license in a computer cluster via a simplified smartphone application. And additional encryption techniques may further preserve the integrity of cluster-wise license information.

In some embodiments, the license validator 130 and/or the computer cluster 140 may be implemented by one or more clouds. A "cloud" may be a network-based computing architecture that provides shared pools of cloud resources on demand. The cloud may also be implemented based on a cloud computing environment 160, which may contain, among other components, one or more virtual machines (VMs) 171-174 and/or physical machines ("hosts") 181. Thus, the cloud may be constructed using multiple hosts 181, and/or multiple VMs 171-174 that are created based on some of the hosts 181. Further, each of the cluster nodes 150 in the computer cluster 140, as well as the license validator 130, may be either a VMs 171 or a host 181.

In some embodiments, the cloud may include a cloud manager/director (not shown in FIG. 1) configured for implementing the various cloud functionalities such as resource pooling, resource allocating, high-availability, and automation, etc. In some embodiments, the cloud may be constructed using products such as VMWARE® vCloud, and the cloud manager may be implemented using a VMWARE vRealize Suite. The cloud 140 may also be configured with a VMWARE VSPHERE server. Alternatively, the cloud 140 may be constructed using any commercial cloud products, such as OpenStack® Cloud, and/or AMAZON® S3 Cloud.

In some embodiments, the cloud computing environment 160 may include one or more virtual machine execution space 170. Each VM execution space 170 may contain multiple VMs 171, 172, 173, and 174 configured to host various applications. Further, the cloud computing environment 160 may include a VM manager or hypervisor (such as VMware ESX® based hypervisor, or Microsoft® Hyper-V® virtualization, all of which are not shown in FIG. 1) to create the VMs 171-174 based on the hardware resources 180. The hardware resources 180 may include one or more hosts 181, each of which may be a physical computer system having a "physical hardware platform" (e.g., an x86 architecture platform). The hypervisor may be configured to construct a "virtual hardware platform" for the VMs 171-174 based on the host 181's physical hardware platform.

In some embodiments, to support the physical hardware platform, the hardware resources 180 may include various "physical hardware components" such as, without limitation, one or more physical Central Processing Units (CPUs) 182, physical memory 183, physical Network Interface Card (NIC) 184, physical storage (e.g., hard drive) 185, and/or additional electronic circuit components (all of which may be supplied by one or more hosts 181). Each of CPU(s) 182 may be configured to execute instructions that perform one or more operations described herein. The instructions can be stored in the memory 183, storage 185, or any other memory in the hosts 181 (e.g., cache memory) that, when executed by the CPU 182, cause the CPU 182 to perform certain operations as described herein. The memory 183 may be non-transitory storage medium configured to store various information, and may include, e.g., random access memory (RAM), read-only memory (ROM), or a combination thereof. The NIC 184 may include one or more network adapters. And the storage 185 may include local storage devices, such as hard disks, flash memory modules, solid state disks, optical disks, and the like. Storage 185 can also include interface(s) configured for communication with one or more network data storage systems, such as host bus adapter(s) configured for communication with a storage array network (SAN) or network-attached storage (NAS), as well as other network data storage systems.

In some embodiments, based on the hardware resources 180, the VM manager may configure a "virtual hardware platform" for the VMs 171-174 with one or more "virtual hardware components" such as, without limitation, one or more virtual CPUs, virtual memory, virtual storage, virtual NIC, and/or additional virtual components (not shown in FIG. 1). With helps from the VM manager, the virtual hardware components may emulate the behaviors and the computing capabilities of the corresponding physical hardware components, thereby allowing the VMs 171-174 to function as if they were physical hosts 181.

In some embodiments, the license agent 141 (and the various modules contained therein) may be implemented using hardware modules or a software system. For example, the license agent 141 may be implemented using a programmable logic device (e.g., Field-programmable gate array, or "FPGA"), which may be an electronic module or digital circuit that can be field-configurable after manufacturing. In other embodiments, the license agent 141 may be a network-enabled hardware module installed in a cluster node 150 and allows external network communications.

Figure 2A:
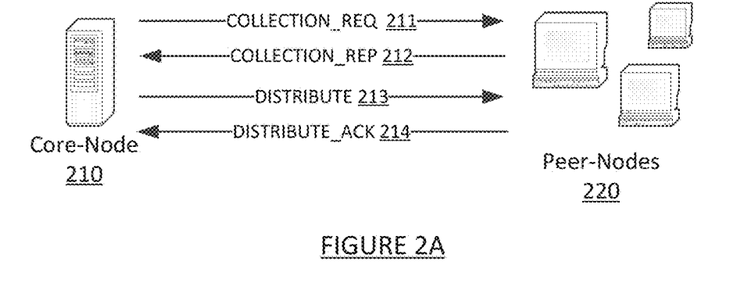
FIGS. 2A, 2B, and 2C illustrate example communications among the cluster nodes during cluster-wise multicast license information aggregation, according to one or more embodiments of the present disclosure.
Figure 2B:
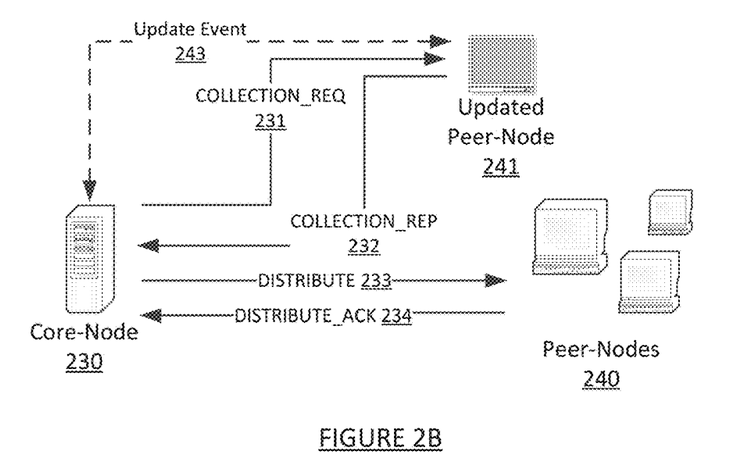
Figure 2C:
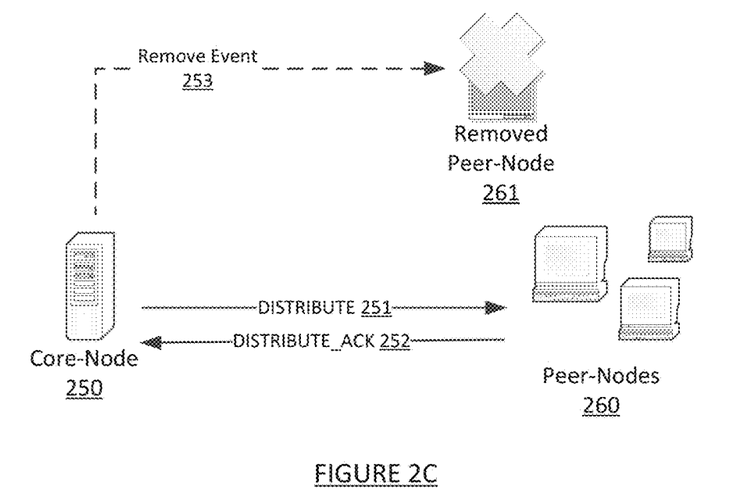

FIGS. 2A, 2B, and 2C illustrate example communications among the cluster nodes during cluster-wise multicast license information aggregation, in accordance to one or more embodiments of the present disclosure. In FIGS. 2A-2C, various modules/components, including core-node, cluster nodes, and license review device, may correspond to their respective counterparts in FIG. 1. For example, the core-node and peer-nodes in FIGS. 2A-2C may correspond to the core-node and peer-nodes of FIG. 1.

In FIG. 2A, a computer cluster may perform a "cluster-initialization" process to collect and replicate all the license information among the cluster nodes 220. The cluster-initialization process may be activated after the initial deployment (including installation and configuration) of the software in the computer cluster. In this case, the core-node 210 may wait for the completion of the initial configurations of the software in all the cluster nodes 220 before starting the cluster-initialization process. In some instances, the core-node 210 may be in charge of all the peer-nodes' software deployment, and so it knows when the software deployment process is completed. Alternatively, the core-node 210 may monitor the peer-nodes 220's software deployment progress.

In some embodiments, after the initial deployments of the software in the computer cluster, the core-node 210 may transmit (211) a collection-request message ("COLLECTION_REQ") to each of the peer-nodes 220 in the computer cluster, requesting all peer-nodes 220 to collect their respective license-info from those software/hardware that are subject to certain license regulations. Specifically, the license agents installed on all the cluster nodes may bind to a specific network communication port to listen to multicast messages. Thus, once the core-node 210 broadcasts the COLLECTION_REQ message through this network communication port, all the peer-nodes 220 that are listening to this port may receive this collection-request message.

In some embodiments, after receiving the collection-request message from the core-node 210, each of the peer-nodes 220 may collect its respective local license-info (including license-configuration and license-usage-data) and generate a corresponding peer-license-info. Optionally, the license agent may retrieve the hardware feature tags (e.g., mainboard serial number, network identifier, firmware/bios unique tag, etc.) associated with the peer-node, and use the hardware feature tags to encrypt the peer-license info. Afterward, in response to the collection-request message, each peer-node 220 may transmit (212) a collection-response message ("COLLECTION_REP") to the core-code 210. The collection-response message may contain the peer-license-info.

In some embodiments, if the core-node 210 does not receive collection-response messages from all the peer-nodes 220, it may either restart the above collection process until the peer-license-info from all the peer-nodes 220 are received successfully. Alternatively, the core-node 210 may transmit (211) an individual collection-request message to those peer-nodes 220 that it did not receive their peer-license-info, and wait for those peer-nodes 220 for their collection-response messages. The core-node 210 may also collect its own license-info.

In some embodiments, based on the peer-license-info received from all the peer-nodes 220 and the license-info from its own, the core-node 210 may aggregate and generate a cluster-license-info that contains cluster-wise license information from all the cluster nodes in the computer cluster. Afterward, the core-node 210 may transmit (213) to all the peer-nodes 220 a distribution message ("DISTRIBUTE") which includes the cluster-license-info. Upon receiving the distribution message, each peer-node 220 may transmit (214) an acknowledge message ("DISTRIBUTE_ACK") to the core-node 210, indicating that it has received and stored the cluster-license-info locally. After receiving the acknowledge messages from all the peer-nodes 220, the above initialization process is completed, and each cluster node in the computer cluster maintains a copy of the cluster-license-info.

In some embodiments, if the core-node 210 does not receive ACK messages from all the peer-nodes 220, it may restart the above collection process until it receives peer-license-info from all the peer-nodes 220. Alternatively, the core-node 210 may transmit (213) an individual distribute message to those peer-nodes 220 that did not deliver acknowledge messages, and wait for those peer-nodes 220 for their DISTRIBUTE_ACK responses. If the number of core-node 210 retrying the above retransmission process surpasses a specific threshold (e.g., 5 times), the license agent on the core-node 210 may transmit an alarm to the sysops through administrative communication channels (e.g., mailbox or message applications).

In some embodiments, the cluster nodes may utilize a cluster-wise "epoch" value to keep track of the different versions of cluster-license-info being distributed to the cluster nodes from time to time. For example, the epoch value may be a monotonically-increasing 64-bit unsigned number, and may be stored in a persistent location (e.g., a database or a secured file) in the core-node 210 and all the peer-nodes 220. The epoch value may be increased in each round of cluster-license-info distribution. In other words, before distributing the cluster-license-info to the peer-nodes 220, the core-node 210 may first increment the epoch value, embed the epoch value along with the cluster-license-info in the distribution message, and then transmit (213) the distribution message to each of the peer-nodes 220. After a round of cluster-license-info distribution, all the cluster nodes in the computer cluster, including the core-node 210 and the peer-nodes 220, will receive the same epoch value and the same cluster-license-info, and may store the received epoch value and cluster-license-info in their local persistent storage.

In some embodiments, if during subsequent communications, a cluster-node receives another version of the cluster-license-info along with another epoch value, it may compare the received epoch value with its locally stored epoch value. If the received epoch value is the same as or smaller than the stored epoch value, it means the received cluster-license-info is either the same as the stored cluster-license-info, or is an older version of the cluster-license-info than the stored cluster-license-info. In this case, the cluster node may choose to ignore the received cluster-license-info.

In some embodiments, after sending (211) out multicast collection-request message, the core-node 210 may start a timeout counter to wait for responses from all the peer-nodes 220. If the core-node 210 does not receive response messages from some of the peer-nodes 220 within the timeout counter period, it may either cease to wait for additional response messages, or resend (211) a specific collection-request message to certain peer-nodes 220 which existences the core-node 210 is aware of. Likewise, after transmitting (213) the distribution message, the core-node 210 may start a timeout counter to wait for acknowledge messages from the peer-nodes 220, and may either resend (213) the distribution message, or stop waiting for acknowledge messages.

In some embodiments, before sending (212) the peer-license-info to the core-code 210, each peer-node 220 may compress and encrypt the peer-license-info using the peer-node's hardware feature tags. This way, even though the core-node 210 receives the peer-license-info from all the peer-nodes 220, without the proper decryption keys, the core-node 210 can only generate a cluster-license-info based on the encrypted peer-license-info, but cannot decrypt the peer-license-info. Such an approach may ensure that the license information in the computer cluster would not be hacked or abused.

In FIG. 2B, after the computer cluster completed the above initialization process, the core-node 230 may perform a "license updating" process to update the license information replicated in the cluster nodes 240 when an update event 243 occurred in the computer cluster. The "update event" 243 may include any situations when new license information is added or when existing license information is changed in the computer cluster. For example, after the initialization process as shown in FIG. 2A is completed, a new peer-node with its distinctive license configuration may be added into the computer cluster; or an existing peer-node may have its license configuration changed (e.g., license added or expired). In these situations, the new peer-node or the existing peer-node may be referred to as an "updated peer-node" 241, and the adding of the peer-node or the updating of the license information may be deemed an update event.

In some embodiments, the core-node 230 may be able to detect an update event 243 at the updated peer-node 241. Specifically, when the updated peer-node 241 is a new cluster node just added into the computer cluster, the new cluster node may identify and communicate with the core-node 230 by querying all the other peer-nodes 240. In this case, the core-node 230 may discover this new cluster node, and may be able to determine this update event 243 indicating that new license information from the updated peer-node 241 needs to be included into the cluster-license-info. Alternatively, the core-node 230 may periodically scan the computer cluster for any newly added peer-node 241.

In some embodiments, the updated peer-node 241 may be an existing cluster node in the computer cluster, and the update event 253 may be a license-related event, such as the adding of new licenses or the expiring of existing licenses at the updated peer-node 241. In this case, the license agent of the updated peer-node 241 may transmit the update event 253 to the core-node 230, informing that the license information in the computer cluster needs to be updated.

In response to an update event 243 from an updated peer-node 241, the core-node 230 may transmit (231) a collection-request message ("COLLECTION_REQ") to the updated peer-node 241, requesting it to collect its license-info from those software/hardware that are regulated by certain licenses. In response to the collection-request message, the updated peer-node 241 may collect its peer-license-info, and may transmit (232) a collection-response message ("COLLECTION_REP") to the core-code 230. Optionally, the peer-license-info contained in the collection-response message may be compressed and encrypted.

In some embodiments, after receiving the peer-license-info from the updated peer-node 241, the core-node 230 may aggregate the peer-license-info into an updated cluster-license-info, and may increment the previously maintained epoch value. The core-node 230 may then transmit (233) a distribution message ("DISTRIBUTE") to all the cluster nodes 240 (including the updated peer-node 241). The distribution message may include the updated cluster-license-info and the newly incremented epoch value. Upon receiving the distribution message, each cluster nodes 240 may transmit (234) a acknowledge message ("DISTRIBUTE_ACK") to the core-node 230, indicating that it has received and stored the updated cluster-license-info. After receiving the acknowledge message from all the other cluster nodes 240, each cluster node in the computer cluster maintains a copy of the updated cluster-license-info and a copy of the newly incremented epoch value.

In some embodiments, the updated peer-node 241 may also represent a peer-node which has been included in the previously published cluster-license-info, but subsequently has license changes. License changes may include installation and activation of licenses, termination and expiration of licenses, and/or changes in scope and coverage of the existing licenses. In this case, the license agent of the updated peer-node 241 may communicate with the license agent of the core-node 230, notifying the update event 243, and the core-node 230 may perform the above licensing updating process to replicate the changes to the cluster nodes 240 in the computer cluster.

In some embodiments, the core-node 230 may generate a partial-cluster-license-info, which only contains the peer-license-info related to the updated peer-node 241. In other words, comparing to a regular cluster-license-info which contains peer-license-info from all the cluster nodes, the "partial-cluster-license-info" does not contain any peer-license-info from any other peer-nodes 240 that do not have license changes. In this case, the core-node 230 may transmit a regular cluster-license-info to the updated peer-node 241, and distribute (233) the partial-cluster-license-info (along with a newly incremented epoch value) to the peer-nodes 240 that do not have license changes. After receiving the partial-cluster-license-info, the peer-nodes 240 that do not have license changes may generate a new version of the cluster-license-info by combine/merge the partial-cluster-license-info with its own copy of the existing version of cluster-license-info. For example, the peer-nodes 240 may remove from the existing version of the cluster-license-info any license-info related to the updated peer-node 241, and then insert the partial-cluster-license-info into the existing version to create the new version of the cluster-license-info. Afterward, the peer-nodes 240 may store the new version of the cluster-license-info and the new epoch value in its local persistent location.

In FIG. 2C, the core-node 250 may perform a "license removing" process to update the license information replicated in the cluster nodes 260 when a remove event 253 occurred in the computer cluster. The "remove event" 253 may include any situations when license information is changed due to the removal of a cluster node from the computer cluster. For example, the peer-node 261 may be physically removed from the computer cluster due to hardware/software failure or retirement, or may be logically removed from the computer cluster due to configuration. In these situations, the affected peer-node may be referred to as a "removed peer-node" 261, and the removal of the peer-node 261 may be deemed a remove event.

In some embodiments, the license agent of the removed peer-node 261 may first allocate the core-node 250 in the computer cluster, and then transmit a message to the core-node 250 indicating its intent to be removed from the computer cluster. Alternatively, the core-node 250 may periodically scan the computer cluster for any peer-nodes that are no longer accessible for a predetermined amount of time. If the core-node 250 detects a large number of cluster nodes 260 not-accessible via the cluster network, it may determine that a large scale network malfunction may be happening, or the connectivity issue may be due to itself. In this case, the core-node 250 may either wait a while before checking the network condition, or determine that it is no longer the core-node of the computer cluster, as the rest of the cluster nodes 260 may already elect another cluster node to serve as the new core-node.

In some embodiments, in response to the identifying of a removed peer-node 261, the core-node 250 may adjust its copy of cluster-license-info to remove license-info associated with the removed peer-node 261, and may generate an updates cluster-license info. Afterward, the core node 250 may transmit (251) a distribution message to all the peer-nodes 260 (excluding the removed peer-node 261). The distribution message may include the updated cluster-license-info and a newly incremented epoch value. Upon receiving the distribution message, each cluster nodes 260 may transmit (252) an acknowledge message to the core-node 250, indicating that it has received and stored the updated cluster-license-info and the newly incremented epoch value. After receiving the acknowledge message from all the other peer-nodes 260, each cluster node in the computer cluster maintains a copy of the updated cluster-license-info which no longer includes license-info of the removed peer-node 261. In addition, the core-node 250 may stop delivering any new license-related messages to this removed peer-node 261.

In some embodiments, the licenses on a peer-node 261 may become expired or terminated. In this case, the license agent on the peer-node 261 may treat the peer-node 261 as an updated peer-node, and the core-node may update the cluster-license-info based on the license update process as shown in FIG. 2B. Alternatively, the license agent on the peer-node 261 may remove/uninstall the software associated with the expired/terminated licenses, and treat the peer-node 261 as a removed peer-node 261, and the core-node 250 may perform a license removal process as shown in FIG. 2C. Optionally, the removed peer-node 261 may delete the locally stored cluster-license-info and the epoch value.

Figure 3:
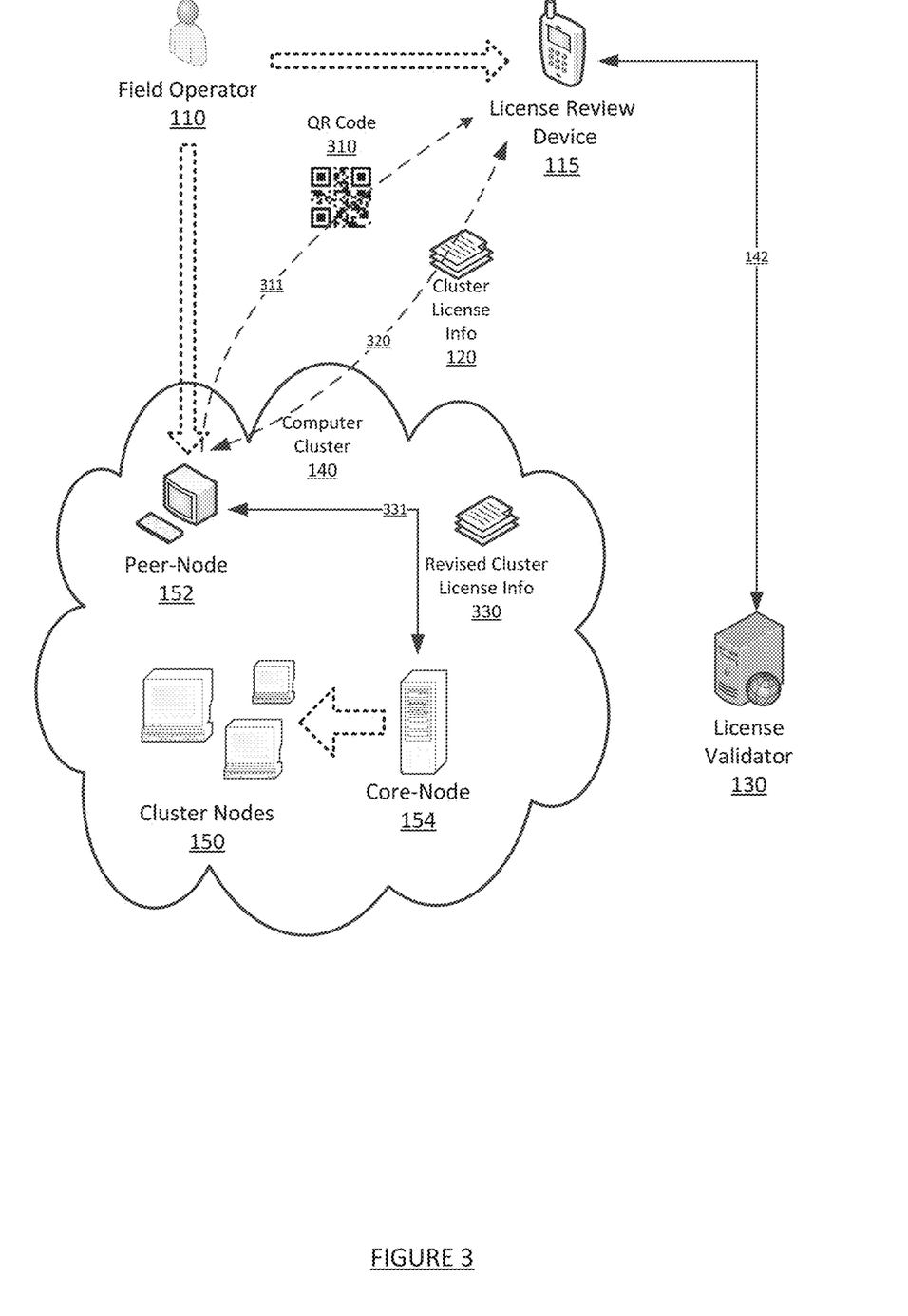
FIG. 3 shows a license inspection and enforcement process, according to one or more embodiments of the present disclosure.

FIG. 3 illustrates a license inspection and enforcement process, according to one or more embodiments of the present disclosure. In FIG. 3, various system and components may correspond to their respective counterparts in FIG. 1. In some embodiments, a field operator 110 may be able to interact with a peer-node 152 to inspect/enforce licenses in the whole computer cluster. For example, the field operator 110 may receive a service request from a specific software vendor, indicating a problem or bug issue related to the software installed in the computer cluster. The field operator 110 may then interact with a peer-node 152, which may be any one of the cluster nodes in the computer cluster, either by remotely log-in, or by physically go on-site to access the peer-node 152. Thus, the field operator 110 may be able to validate the cluster-wise license information of the whole computer cluster during an on-site service of a single cluster node.

In some embodiments, the field operator 110 may have access to the license agent installed on the peer-node 152, and utilize a license review device 115 to retrieve and review the cluster-license-info 120 stored on the peer-node 152. Specifically, the license agent installed on the peer-node 152 may be configured to generate one or more QR code images (e.g. QR code 310) for the license review device 115. The license agent may pre-generate and store the generated QR code 310 on the peer-node 152. Alternatively, license agent may dynamically generate the QR code 310 when the field operator 100 invokes the license agent.

In some embodiments, the QR code 310 may include a locator, identifier, or tracker (e.g., URL path or database access ID) to direct the license review device 115 to the cluster-license-info 120 stored in the peer-node 152. Alternatively, the whole cluster-license-info may be embedded into the QR code 310. When the cluster-license-info contains encrypted data, the license agent may utilize a binary-to-text encoding module (e.g., base64 or uuencode) to generate text-formatted data for the QR code 310. Further, the license agent may also include in the QR code 310 hardware feature tags of the peer-node 152 as well as encryption keys used for encrypting the cluster-license-info.

In some embodiments, the application or app installed in the license review device 115 (e.g., a smartphone) may be configured to determine the integrity of the cluster-license-info and detect any license abuses in the computer cluster. Once the QR code 310 is displayed on the peer-node 152, the field operator 110 may use the smartphone app to read the QR code 310, and decode the information embedded therein. Afterward, the smartphone app may either retrieve the cluster-license-info from the peer-node 152 based on the locator/identifier decoded from the QR code 310, or retrieve the cluster-license-info directly from the QR code 310. If the license review device 115 is unable to access the QR code 310 from the peer-node 152, unable to extract cluster-license-info 120 from the peer-node 152, or unable to evaluate the legitimacy of the cluster-license-info 120, it may determine that the peer-node 152 is corrupted. In this case, the field operator 110 may cease to perform any further support services to the peer-node 152 or the computer cluster, and record and report the issue.

In some embodiments, after retrieving the cluster-license-info 120 from the peer-node 152, the license review device 115 may first perform a preliminary validation of the cluster-license-info 120, and then transmit the cluster-license-info 120 to a remote license validator 130 for further validation. During preliminary validation, the license review device 115 may evaluate the integrity and the encryption of the cluster-license-info 120 for any sign of corruption or tampering. If evidence of corruption or tampering is found, the license review device 115 may display a warning to the field operator 110, so that the field operator 110 may access another peer-node to retrieve the cluster-license-info 120. Further, the field operator 110 may cease to perform any on-site services when a legitimate license in the peer-node 152 cannot be found.

In some embodiments, after preliminary validation, the license review device 115 may transmit (142) the cluster-license-info 120 to the license validator 130 for further in-depth validation. The license validator 130 may contain a decryption master key, which can decrypt all the peer-license-info contained in the cluster-license-info 120. Afterward, the license validator 130 may evaluate the license-configurations and the license-usage-data contained in the peer-license-info, and determine whether there are any license violations in the computer clusters. Alternatively, the smartphone app installed on the license review device 115 may contain master keys to decrypt the encrypted cluster-license-info.

In some embodiments, the license validator 130 may identify signs of software misusages (e.g., without proper licenses or after the expiration of the licenses), and detect license abuses (e.g., usages beyond the device-based, user-based, group-based licenses, hacked licenses), based on the license configurations and the license-usage-data embedded in the cluster-license-info. Alternatively, the license validator 130 may validate the cluster-license-info based on license configurations that it maintains. For example, if a cluster node is required to register its licenses associated with the software installed thereon, the license validator 130 may locally store the license configuration for the cluster node. During validation, the license validator 130 may retrieve the license-configuration for the cluster node from its storage, and compare it with the license-usage-data associated with this cluster node.

In some embodiments, the license validator 130 may aggregate the software usage statuses from multiple peer-nodes, and determine whether a multi-user or multi-device type of license is violated. For example, assuming a license can be simultaneously installed and used on up to three cluster nodes, if the license validator 130 processes the peer-license-info from all the cluster nodes and identifies that there are more than three cluster nodes simultaneously installed with this license, then the license validator 130 may determine that a license-misuse violation occurred in the computer cluster.

In some embodiments, the license validator 130 may generate a revised cluster-license-info 330 based on the license violations detected from the cluster-license-info. Specifically, the "revised cluster-license-info" 330 may include one or more enforcement actions designated to certain cluster nodes with license violations. An "enforcement action" may be a license-related operation to be performed on a specific cluster node, such as activating/deactivating a license, removing a license, changing the type of license, adjusting number of licenses, or uninstalling the software. For example, when the license validator 130 identifies a multi-device license violation that affects several cluster nodes, it may generate a set of enforcement actions including deactivating or removing the licenses from some cluster nodes, and changing the type of license from multi-device to device-based. The license validator 130 may then merge the enforcement actions into the revised cluster-license-info 330.

In some embodiments, the license validator 130 may return (142) the validation outcomes and the revised cluster-license-info to the license review device 115. The license review device 115 may then transmit (320) the revised cluster-license-info 330 to the peer-node 152. Afterward, the peer-node 152 may further transmit (331) the revised cluster-license-info 330 to the core-node 154, which may then distribute the revised cluster-license-info 330 to all the cluster nodes 150 in the computer cluster 140.

In some embodiments, after receiving the revised cluster-license-info 330, each of the cluster nodes 150 may process the portions of the revised cluster-license-info 330 that is directed to itself. Specifically, for each cluster node 150, its license agent may extract from the revised cluster-license-info 330 the enforcement actions corresponding to the cluster node 150, and then perform these enforcement actions accordingly. For example, the license agent may activate/deactivate licenses, or remove/terminate illegal licenses, or even uninstall software based on the enforcement actions. After all the cluster nodes 150 received and processed the revised cluster-license-info 330, the core-node 154 may initiate another round cluster-initiation process (as described in FIG. 2A) to collect and propagate cluster-wise license information.

Figure 4:
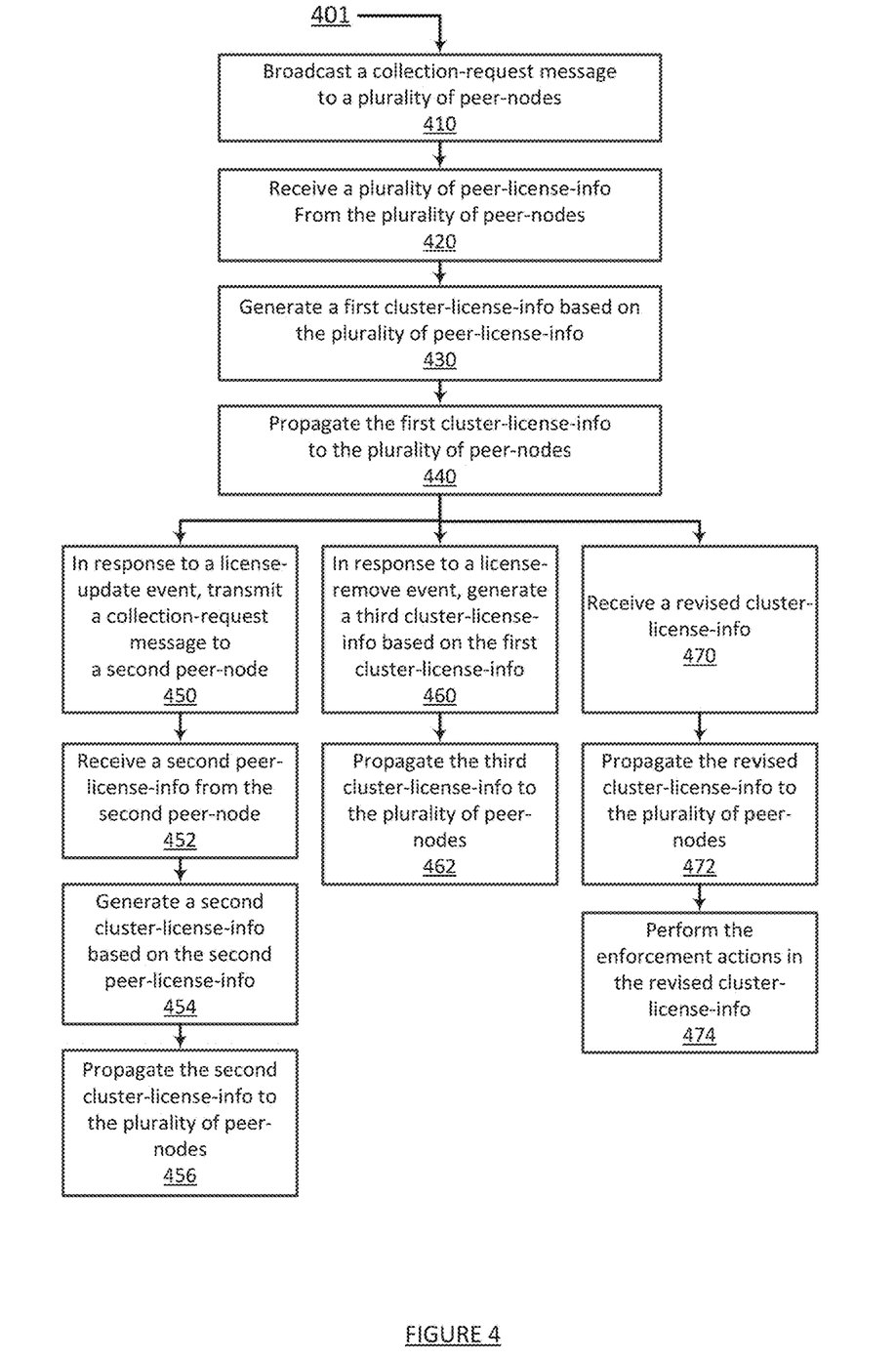
FIG. 4 shows a flow diagram illustrating a process for replicating and enforcing license information in a computer cluster, according to one or more embodiments of the present disclosure.

FIG. 4 shows a flow diagram illustrating a process for replicating and enforcing license information in a computer cluster, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a computer cluster may include a plurality of cluster nodes. A core-node may be elected from the plurality of cluster nodes, and those plurality of cluster nodes that are not elected as the core-node may be deemed a plurality of peer-nodes. The core-node may broadcast a collection-request message to each of the plurality of peer-nodes.

At block 420, the core-node may receive a plurality of peer-license-info from the plurality of peer-nodes. Specifically, each of the plurality of peer-license-info includes license-info collected by and associated with a corresponding one of the plurality of peer-nodes. In some embodiments, in response to a determination that no peer-license-info is received from a first peer-node selected from the plurality of peer-nodes, the core-node may retransmit the collection-request message to the first peer-node, and await for the first peer-node to respond with its corresponding peer-license-info.

At block 430, the core-node may generate a first cluster-license-info based on the plurality of peer-license-info. In some embodiments, the first cluster-license-info may also include a corresponding peer-license-info collected by the core-node.

At block 440, the core-node may propagate the first cluster-license-info to each of the plurality of peer-nodes. In some embodiments, the first cluster-license-info is configured for detecting license violations among the plurality of cluster nodes. Specifically, a license validator may extract from the first cluster-license-info a license-configuration and a license-usage-data associated with specific software. The license validator may then detect license violations by evaluating the license-usage-info based on the license configuration.

At block 450, in response to a license-update event from a second peer-node selected from the plurality of peer-nodes, the core-node may transmit the collection-request message to the second peer-node. Specifically, the license-update event may be a new peer-node event, a license activation event, a license termination event, or a license violation event.

At block 452, the core-node may receive a second peer-license-info from the second peer-node. At block 454, the core-node may generate a second cluster-license-info by adjusting the first cluster-license-info based on the second peer-license-info. At block 456, the core-node may propagate the second cluster-license-info to each of the plurality of peer-nodes.

At block 460, in response to a license-remove event from a third peer-node selected from the plurality of peer-nodes, the core-node may generate a third cluster-license-info by removing peer-license-info associated with the third peer-node from the cluster-license-info. At block 462, the core-node may propagate the third cluster-license-info to each of the plurality of peer-nodes.

At block 470, the core-node may receive a revised cluster-license-info generated based on the first cluster-license-info. In some embodiments, the license validator may generate the revised cluster-license-info by evaluating the first cluster-license-info for any license violations. The revised cluster-license-info may contain a set of enforcement actions.

At block 472, the core-node may propagate the revised cluster-license-info to each of the plurality of peer-nodes. Each of the plurality of peer-nodes may be configured to adjust its corresponding license-configuration based on the enforcement actions in the revised cluster-license-info. At block 474, in response to a determination that the corresponding license-configuration indicating a license violation, a peer-node may perform the enforcement actions to deactivate its software.

Thus, systems and methods for replicating and enforcing license information in a computer cluster have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for replicating and enforcing license information in a computer cluster, the method comprising:
   receiving, by a core-node selected from a plurality of cluster nodes in the computer cluster, a plurality of peer-license-info from a plurality of peer-nodes selected from the plurality of cluster nodes, wherein each of the plurality of peer-license-info includes license-info collected by and associated with a corresponding one of the plurality of peer-nodes;
   generating, by the core-node, a first cluster-license-info based on the plurality of peer-license-info;
   propagating, by the core-node, the first cluster-license-info to each of the plurality of peer-nodes, wherein the first cluster-license-info is configured for detecting license violations among the plurality of cluster nodes; and propagating, by the core-node, a revised cluster-license-info to each of the plurality of peer-nodes, wherein each of the plurality of peer-nodes is configured to perform its corresponding enforcement actions contained in the revised cluster-license-info to adjust its license configuration.

2. The method as recited in the claim 1, further comprising:

in response to a license-update event from a first peer-node selected from the plurality of peer-nodes, transmitting, by the core-node, a collection-request message to the first peer-node;

receiving, by the core-node, a first peer-license-info from the first peer-node;

generating, by the core-node, a second cluster-license-info by adjusting the first cluster-license-info based on the first peer-license-info; and propagating, by the core-node, the second cluster-license-info to each of the plurality of peer-nodes.

3. The method as recited in the claim 2, wherein the license-update event is a new peer-node event, a license-activation event, a license-termination event, or a license-violation event.

4. The method as recited in the claim 1, further comprising:

in response to a license-remove event from a first peer-node selected from the plurality of peer-nodes, generating, by the core-node, a second cluster-license-info by removing peer-license-info associated with the first peer-node from the cluster-license-info; and propagating, by the core-node, the second cluster-license-info to each of the plurality of peer-nodes.

5. The method as recited in the claim 1, wherein the detecting of license violations in the computer cluster comprises:

extracting from the first cluster-license-info a license-configuration and a license-usage-data associated with a specific software; and detecting license violations by evaluating the license-usage-data based on the license-configuration.

6. The method as recited in the claim 1, further comprising:

broadcasting, by the core-node, a collection-request message to each of the plurality of peer-nodes; and in response to a determination that no peer-license-info is received from a first peer-node selected from the plurality of peer-nodes, retransmitting, by the core-node, the collection-request message to the first peer-node.

7. The method as recited in the claim 1, further comprising:

receiving, by the core-node, the revised cluster-license-info generated based on the first cluster-license-info.

8. The method as recited in the claim 1, wherein each of the plurality of peer-nodes perform its corresponding enforcement actions by:

in response to a license violation detected on a specific peer-node of the plurality of peer-nodes, adjusting software on the specific peer-node by activating, deactivating, or changing the software's license configuration.

9. The method as recited in the claim 8, wherein the license violation is a license-expiration violation, a license-abuse violation, or a no-license violation.

10. A system for enforcing license information in a computer cluster, the system comprising:

a plurality of peer-nodes selected from a plurality of cluster nodes, wherein each of the plurality of cluster nodes includes a computing device and a corresponding license configuration; and a core-node selected from the plurality of cluster nodes, wherein the core-node includes another computing device and is configured to:

receive a plurality of peer-license-info from the plurality of peer-nodes, wherein each of the plurality of peer-license-info includes license-info collected by and associated with a corresponding one of the plurality of peer-nodes, generate a first cluster-license-info based on the plurality of peer-license-info, propagate the first cluster-license-info to each of the plurality of peer-nodes, wherein the first cluster-license-info is configured for detecting license violations among the plurality of cluster nodes, and propagate a revised cluster-license-info to each of the plurality of peer-nodes, wherein each of the plurality of peer-nodes is configured to perform its corresponding enforcement actions contained in the revised cluster-license-info to adjust its license configuration.

11. The system of claim 10, wherein the core-node is further configured to:

in response to a license-update event from a first peer-node selected from the plurality of peer-nodes, transmit a collection-request message to the first peer-node, receive a first peer-license-info from the first peer-node, generate a second cluster-license-info by adjusting the first cluster-license-info based on the first peer-license-info, and propagate the second cluster-license-info to each of the plurality of peer-nodes.

12. The system of claim 10, wherein the core-node is further configured to:

in response to a license-remove event from a first peer-node selected from the plurality of peer-nodes, generate a second cluster-license-info by removing peer-license-info associated with the first peer-node from the cluster-license-info, and propagate the second cluster-license-info to each of the plurality of peer-nodes.

13. The system of claim 10, wherein the core-node is further configured to:

receive the revised cluster-license-info generated based on the first cluster-license-info.

14. The system of claim 13, wherein each of the plurality of peer-nodes adjusts its corresponding license configuration by:

in response to a license violation detected on a specific peer-node of the plurality of peer-nodes, adjusting software on the specific peer-node by, activating, deactivating, or changing the software's license configuration.

* * * * *